US012627974B2

(12) United States Patent
Kumar et al.

(10) Patent No.: US 12,627,974 B2
(45) Date of Patent: May 12, 2026

(54) UPDATED ARTIFICIAL INTELLIGENCE OR MACHINE LEARNING CAPABILITIES REPORTING

(71) Applicant: QUALCOMM Incorporated, San Diego, CA (US)

(72) Inventors: Rajeev Kumar, San Diego, CA (US); Aziz Gholmieh, Del Mar, CA (US); Xipeng Zhu, San Diego, CA (US); Gavin Bernard Horn, La Jolla, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/662,528

(22) Filed: May 9, 2022

(65) Prior Publication Data

US 2023/0362625 A1      Nov. 9, 2023

(51) Int. Cl.
*H04W 8/22*       (2009.01)
*H04W 8/24*       (2009.01)
*H04W 72/51*      (2023.01)

(52) U.S. Cl.
CPC ............. *H04W 8/24* (2013.01); *H04W 72/51* (2023.01)

(58) Field of Classification Search
CPC ................................ H04W 8/24; H04W 72/51
See application file for complete search history.

(56) References Cited

U.S. PATENT DOCUMENTS

| | | | |
|---|---|---|---|
| 2023/0232211 A1* | 7/2023 | Hong ...................... | H04W 8/22 |
| | | | 455/422.1 |
| 2024/0015836 A1* | 1/2024 | Yamamoto ............ | H04W 68/12 |
| 2024/0289694 A1* | 8/2024 | Tian ........................ | G06N 20/00 |
| 2024/0323717 A1* | 9/2024 | Chen ..................... | H04W 24/02 |
| 2025/0219898 A1* | 7/2025 | Li ........................... | H04L 41/16 |

FOREIGN PATENT DOCUMENTS

| | | | |
|---|---|---|---|
| EP | 4175338 A1 | 5/2023 | |
| WO | 2021258370 A1 | 12/2021 | |
| WO | WO 2022220973 * | 10/2022 | .............. H04W 8/24 |

OTHER PUBLICATIONS

International Search Report and Written Opinion—PCT/US2023/018063—ISA/EPO—Jul. 13, 2023.

* cited by examiner

*Primary Examiner* — Dai Phuong
(74) *Attorney, Agent, or Firm* — Harrity & Harrity, LLP

(57)      ABSTRACT

Various aspects of the present disclosure generally relate to wireless communication. In some aspects, a user equipment (UE) may transmit an update to a previously reported set of UE artificial intelligence (AI) or machine learning (ML) capabilities. The UE may receive a configuration associated with performance of UE AI or ML operations based at least in part on the update. Numerous other aspects are described.

30 Claims, 8 Drawing Sheets

100

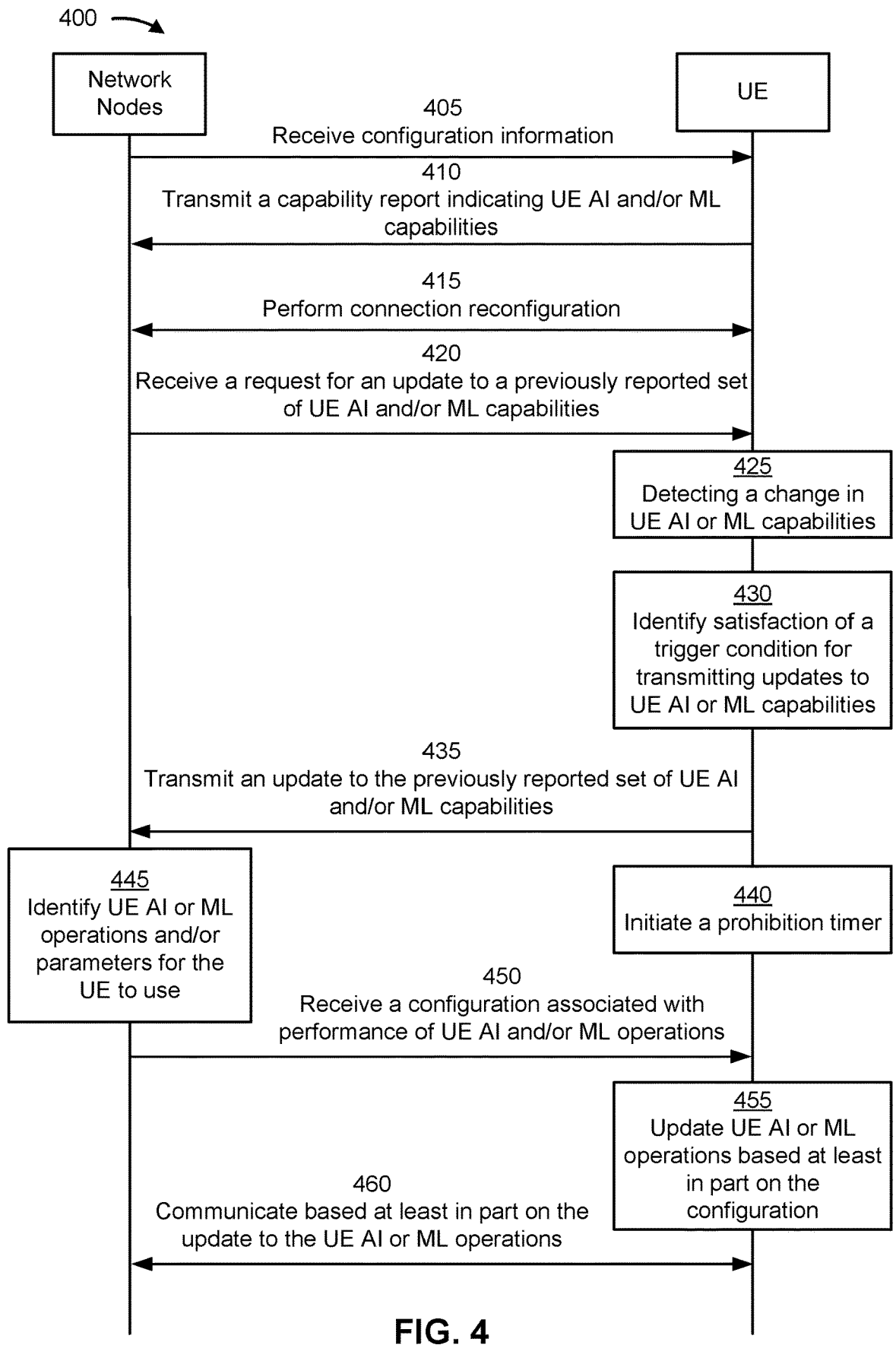

400

Network Nodes

UE

405
Receive configuration information

410
Transmit a capability report indicating UE AI and/or ML capabilities

415
Perform connection reconfiguration

420
Receive a request for an update to a previously reported set of UE AI and/or ML capabilities 425
Detecting a change in UE AI or ML capabilities 430
Identify satisfaction of a trigger condition for transmitting updates to UE AI or ML capabilities 435
Transmit an update to the previously reported set of UE AI and/or ML capabilities 445
Identify UE AI or ML operations and/or parameters for the UE to use 440
Initiate a prohibition timer 450
Receive a configuration associated with performance of UE AI and/or ML operations 455
Update UE AI or ML operations based at least in part on the configuration 460
Communicate based at least in part on the update to the UE AI or ML operations

510 Transmit an update to a previously reported set of UE artificial intelligence (AI) or machine learning (ML) capabilities 520 Receive a configuration associated with performance of UE AI or ML operations based at least in part on the indication 610   Receive an update to a previously reported set of user equipment (UE) artificial intelligence (AI) or machine learning (ML) capabilities 620   Transmit a configuration associated with performance of UE AI or ML operations based at least in part on the indication

600

UPDATED ARTIFICIAL INTELLIGENCE OR MACHINE LEARNING CAPABILITIES REPORTING

FIELD OF THE DISCLOSURE

Aspects of the present disclosure generally relate to wireless communication and to techniques and apparatuses for updated artificial intelligence or machine learning capabilities reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations (e.g., network nodes) that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an update to a previously reported set of UE artificial intelligence (AI) or machine learning (ML) capabilities. The method may include receiving a configuration associated with performance of UE AI or ML operations based at least in part on the update.

Some aspects described herein relate to a method of wireless communication performed by a base station. The method may include receiving an update to a previously reported set of UE AI or ML capabilities. The method may include transmitting a configuration associated with performance of UE AI or ML operations based at least in part on the update.

Some aspects described herein relate to a UE for wireless communication. The user equipment may include a memory and one or more processors coupled to the memory. The one or more processors may be configured to transmit an update to a previously reported set of UE AI or ML capabilities. The one or more processors may be configured to receive a configuration associated with performance of UE AI or ML operations based at least in part on the update.

Some aspects described herein relate to a base station for wireless communication. The base station may include a memory and one or more processors coupled to the memory. The one or more processors may be configured to receive an update to a previously reported set of UE AI or ML capabilities. The one or more processors may be configured to transmit a configuration associated with performance of UE AI or ML operations based at least in part on the update.

Some aspects described herein relate to a non-transitory computer-readable medium that stores a set of instructions for wireless communication by a UE. The set of instructions, when executed by one or more processors of the UE, may cause the UE to transmit an update to a previously reported set of UE AI or ML capabilities. The set of instructions, when executed by one or more processors of the UE, may cause the UE to receive a configuration associated with performance of UE AI or ML operations based at least in part on the update.

Some aspects described herein relate to a non-transitory computer-readable medium that stores a set of instructions for wireless communication by a base station. The set of instructions, when executed by one or more processors of the base station, may cause the base station to receive an update to a previously reported set of UE AI or ML capabilities. The set of instructions, when executed by one or more processors of the base station, may cause the base station to transmit a configuration associated with performance of UE AI or ML operations based at least in part on the update.

Some aspects described herein relate to an apparatus for wireless communication. The apparatus may include means for transmitting an update to a previously reported set of AI or ML capabilities. The apparatus may include means for receiving a configuration associated with performance of AI or ML operations based at least in part on the update.

Some aspects described herein relate to an apparatus for wireless communication. The apparatus may include means for receiving an update to a previously reported set of UE AI or ML capabilities. The apparatus may include means for transmitting a configuration associated with performance of UE AI or ML operations based at least in part on the update.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with updated artificial intelligence or machine learning capabilities reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
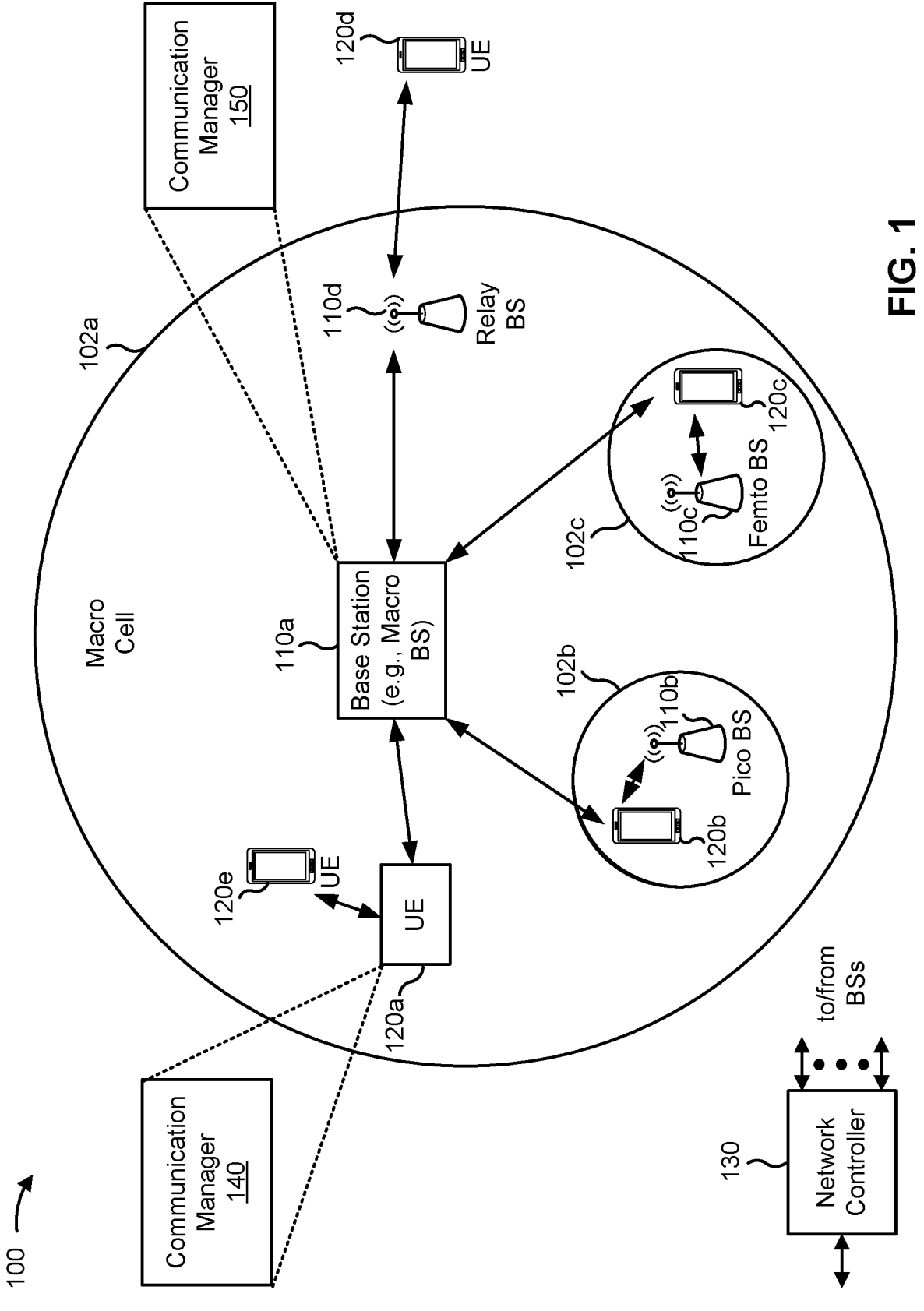
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an update to a previously reported set of UE AI or ML capabilities; and receive a configuration associated with performance of UE AI or ML operations based at least in part on the update. Additionally, or alternatively, the communication manager 140 may perform one or more other operations described herein.

In some aspects, a network node (e.g., the base station 110, or a device associated with or part of the base station 110) may include a communication manager 150. As described in more detail elsewhere herein, the communication manager 150 may receive an update to a previously reported set of UE AI or ML capabilities; and transmit a configuration associated with performance of UE AI or ML operations based at least in part on the update. Additionally, or alternatively, the communication manager 150 may perform one or more other operations described herein.

In some aspects, the term "base station" (e.g., the base station 110) or "network node" or "network entity" may refer to an aggregated base station, a disaggregated base station (e.g., described in connection with FIG. 8), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
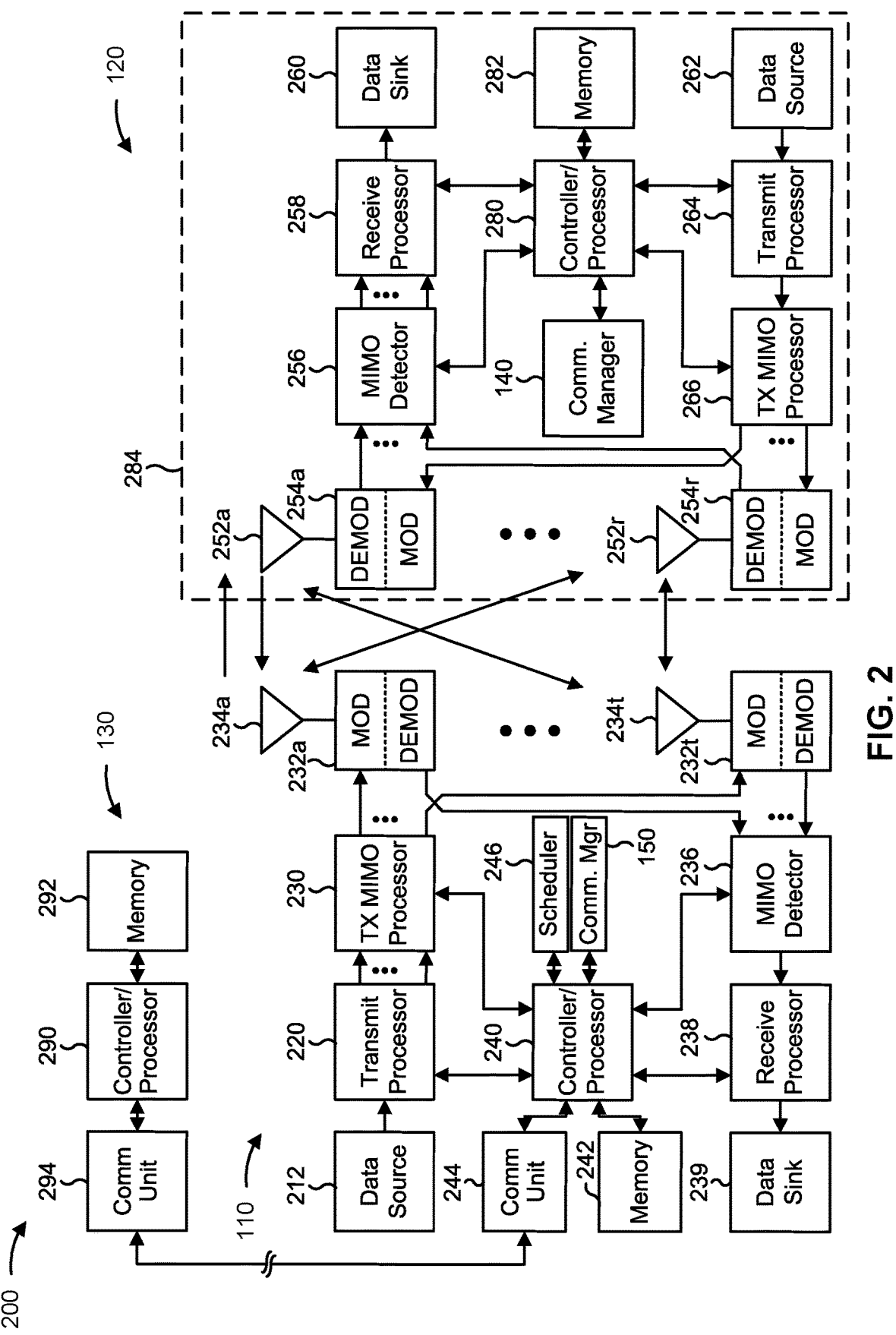
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with updated AI or ML capabilities reporting, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for transmitting an update to a previously reported set of UE AI or ML capabilities; and/or means for receiving a configuration associated with performance of UE AI or ML operations based at least in part on the update. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an update to a previously reported set of UE AI or ML capabilities; and/or means for transmitting a configuration associated with performance of UE AI or ML operations based at least in part on the update. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
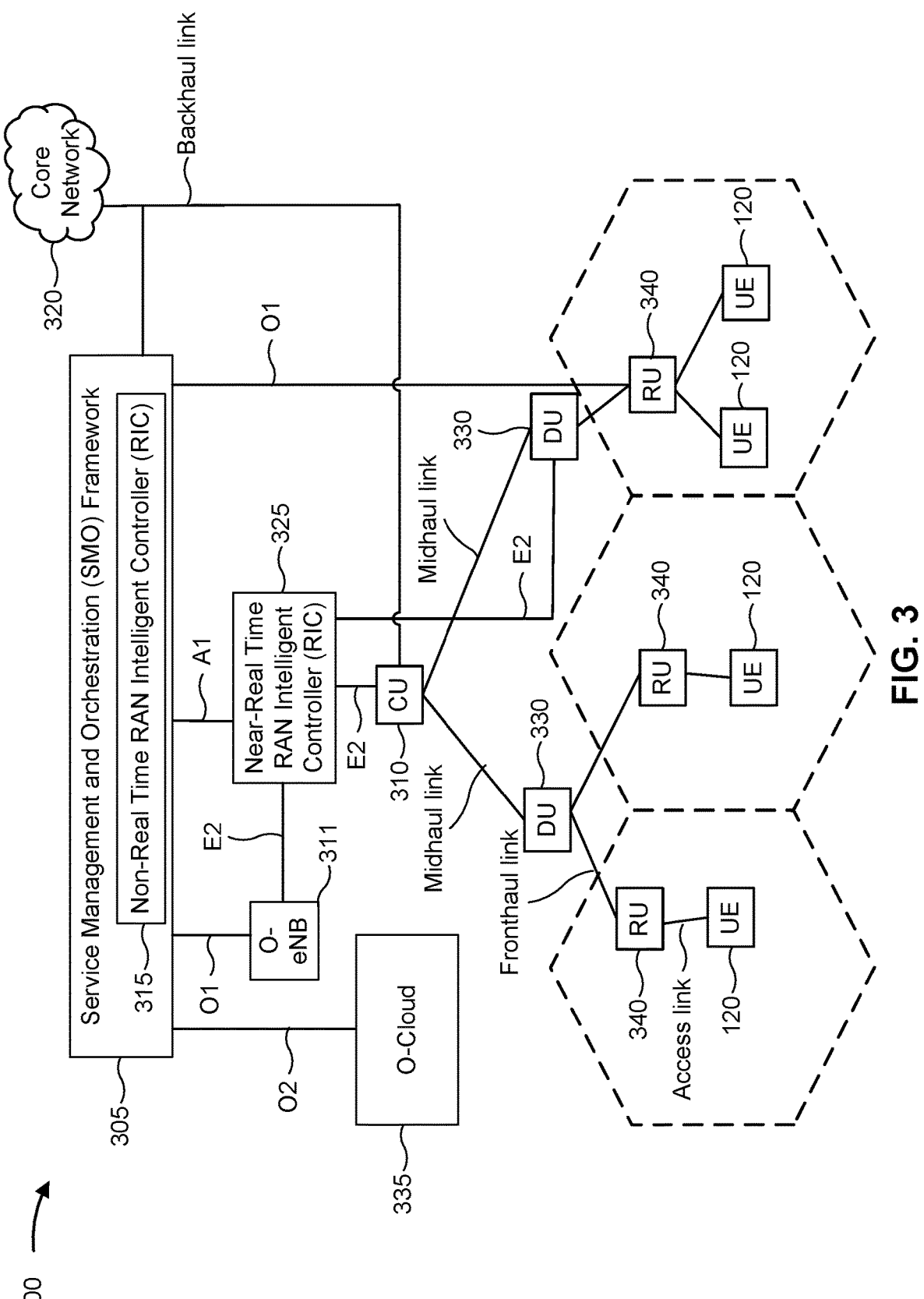
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework

305 (such as reconfiguration via 01) or via creation of RAN management policies (such as A1 policies).

As indicated above, FIG. 3 is provided as an example. Other examples may differ from what is described with regard to FIG. 3.

In some networks, a UE and a network node (e.g., a RAN network node, such as a base station, CU, DU, and/or RU) may exchange information to establish a configuration for communication via a wireless network. For example, the network node may provide configuration information for performing of operations at the UE and/or for reporting capabilities of the UE for performing operations. The UE may transmit an indication of capabilities of the UE (e.g., a capability report) that indicates operations that the UE supports, parameters for which the UE supports operations, and/or resources that may be used to support operations, among other examples. For example, the UE may transmit UE capability information as an RRC message during an initial registration process (e.g., as part of a connection process).

In some networks, the UE may provide capability information associated with performance of UE AI or ML operations. The capability information may be based at least in part on an amount of available power resources and/or available computing resources at the UE. However, the amount of available power resources and/or available computing resources at the UE may change after the UE transmits the capability information. For example, after time, the UE may not have a capability to support UE AI or ML models that are configured at the UE based at least in part on a change in UE AI or ML capabilities. In this case, the UE may fail to satisfy timing requirements associated with the UE AI or ML models (e.g., an inference deadline and/or a training deadline), which may cause the UE AI or ML models to fail. Failure of the UE AI or ML models may consume computing, power, network, and/or communication resources based at least in part on lost efficiencies that may have otherwise been gained by using the UE AI or ML models (or replacement UE AI or ML models) and/or based at least in part on detecting and/or correcting communication errors caused by the failure, among other examples.

In some aspects described herein, a UE may transmit an update to a previously reported set of UE AI or ML capabilities. For example, the UE may transmit the update using a UE assistance information (UAI)-based solution and/or dynamic UE AI/ML capability signaling. The UE may, based at least in part on transmitting the update, receive a configuration associated with performance of UE AI or ML operations.

In some aspects, the set of UE AI or ML capabilities may indicate parameters such as processing capability, a memory capability, general hardware acceleration capability, supported libraries, supported AI and/or ML model formats, supported AI and/or ML models, a maximum number of concurrent AI and/or ML operations supported, tested model combinations, and/or quantization for the AI and/or ML operations, among other examples.

In some aspects, the UE may use UAI to indicate if the UE cannot meet inference and/or training deadlines associated with configured AI or ML operations, and the UE may provide an update of AI/ML capabilities to the network. In the UAI, UE may include an indication of whether UE is interested in (e.g., has determined that the UE would benefit communications by) performing AI/ML based procedure, an update to UE AI or ML capabilities, a list of affected model IDs, a list of model combinations that can or cannot be supported concurrently and their corresponding quantization levels, and/or a list of neural network IDs that can or cannot be supported due to overheating, power, and/or computational power issues, among other examples.

In some aspects, the update to the AI or ML capabilities may indicate updates to processing capability, memory capability, general hardware acceleration capability, supported libraries, supported models, maximum number of concurrent AI/ML task supported, tested model combinations, and/or quantization level, among other examples. In some aspects, the list of affected model IDs may indicate a list of model IDs that have suffered due to reduced processing, memory, and/or acceleration capabilities, among other examples. Additionally, or alternatively, the UE may indicate model IDs, quantization levels, and/or a model identifier if the UE supports satisfaction of an inference or training deadline for one or more models. In some aspects, the UE may indicate model IDs and quantization levels at which the UE supports satisfaction of an inference or training deadline for one or more models.

The network node may configure one or more parameters for the UE to use for transmitting the update (e.g., via UAI). For example, the network node may configure (e.g., using AIML-UEAssistance) the UE with the one or more parameters. In some aspects, the network node may transmit the configuration using an RRC message (e.g., in otherConfig under RRCReconfig). The one or more parameters may include a prohibition timer (e.g., T34x) that indicates that the UE is not allowed to transmit an additional update to the capability information until a specified amount of time has passed from transmitting the capability information (e.g., the prohibition time starts when transmitting the update). Additionally, or alternatively, the one or more parameters may define event-based UAI reporting. For example, the network node may define one or more triggering conditions for the UE to report UAI for AI or ML capabilities (e.g., the update to the UE AI or ML capabilities).

The one or more triggering conditions may include processing capability of the UE is reduced to a configured percentage value (e.g., 75%, 50%, or 25%, among other examples), available memory of the UE is reduced to a configured percentage value (e.g., 75%, 50%, or 25%, among other examples), hardware acceleration of the UE is reduced to a configured percentage value, (e.g., 75%, 50%, or 25%, among other examples), a capability of the UE to run a maximum number of concurrent AI or ML operations (e.g., tasks) is reduced by configured threshold (e.g., if UE can run only up to {'$Y_1$',' '$Y_2$', . . . , '$Y_K$} number of AI/ML models simultaneously), and/or a deadline (e.g., inference/training time requirement) failing to be satisfied for a number (e.g., one or more than one) configured model or a configured number (e.g., one or more than one) model combination for a configured number of operations (e.g., a single iterations with a missed deadline or a number of iterations with missed deadlines), among other examples.

Based at least in part on the network node receiving the update to the UE AI or ML capabilities, the network node may transmit a configuration to the UE associated with performance of the UE AI or ML operations. For example, if the UE indicates that the UE is no longer interested in AI/ML based procedure, the network node may release one or more AI and/or ML configurations. In some examples when the UE indicates that the UE is ready and/or interested in performing AI and/or ML operations, the network node may transmit an AI and/or ML configuration to the UE.

In some aspects, if the UE indicates updated capabilities, the network node may deactivate and/or release a model configuration for which an inference and/or a training result cannot be obtained in time for a deadline and/or instruct the UE to fallback to a legacy or previously configured procedure. In some aspects, if the UE indicates updated capabilities, the network node may deactivate and/or release a model configuration for which an inference and/or a training result cannot be obtained in time for a deadline and send an updated configuration based at least in part on the update to the UE AI or ML capabilities.

In some aspects, the UE may transmit the update to the UE AI or ML capabilities using an RRC message (e.g., a UE AI or ML capability transfer message). In some aspects, the UE may transmit the RRC message in a dynamic fashion. For example, the UE may transmit the RRC message as UE-triggered AI/ML capability reporting. The UE may dynamically indicate to the network node if the UE is interested in one or more UE AI or ML operations. and/or the UE may autonomously update the UE AI or ML capabilities (e.g., if required by the network node or a communication protocol, among other examples).

In another example, the UE may autonomously update the UE AI or ML capabilities with a restriction applied. For example, the UE may dynamically indicate to the network node if the UE is interested in UE AI or ML operations based procedure, the UE may autonomously update the UE AI or ML capabilities (e.g., if required), and the UE may start a prohibition timer that restricts transmission of an update of UE AI or ML capabilities until the prohibition timer expires, among other examples. The prohibition timer may be configured based at least in part on a communication protocol and/or based at least in part on a configuration indicated from the network node (e.g., using RRCReconfiguration).

In another example, the UE may transmit the updated to the UE AI or ML capabilities based at least in part on network configured event triggers. For example, the network node may configure the UE to indicate when the UE is to send the update to the UE AI or ML capabilities (e.g., the updated may indicate whether the UE is interested in UE AI or ML operations). The network node may configure the UE to report the update to the UE AI or ML capabilities based at least in part on a processing capability of the UE being reduced to a configured percentage value (e.g., 75%, 50%, or 25%, among other examples), available memory of the UE being is reduced to a configured percentage value (e.g., 75%, 50%, or 25%, among other examples), hardware acceleration of the UE is reduced to a configured percentage value (e.g., 75%, 50%, or 25%, among other examples), a capability of the UE to run a maximum number of concurrent AI or ML operations (e.g., tasks) is reduced by configured threshold (e.g., if UE can run only up to {'$Y_1$',' '$Y_2$', . . . , '$Y_K$} number of AI/ML models simultaneously), and/or a deadline (e.g., inference/training time requirement) failing to be satisfied for a number (e.g., one or more than one) configured model or a configured number (e.g., one or more than one) model combination for a configured number of operations (e.g., a single iteration with a missed deadline or a number of iterations with missed deadlines), among other examples.

Based at least in part on the UE transmitting an update to UE AI or ML capabilities, the network node may update configurations and/or AI or ML models for the UE to use in communication with the network node that is based at least in part on the updated UE AI or ML capabilities. In this way, the UE may avoid a configuration of AI or ML operations that are likely to fail based at least in part on reduced UE AI or ML capabilities. Avoiding a configuration of AI or ML operations that are likely to fail may conserve computing, power, network, and/or communication resources that may have otherwise been consumed based at least in part on lost efficiencies that may have been gained by using the UE AI or ML models (or replacement UE AI or ML models) and/or based at least in part on detecting and/or correcting communication errors caused by the failure, among other examples.

FIG. 4 is a diagram of an example 400 associated with updated AI or ML capabilities reporting, in accordance with the present disclosure. As shown in FIG. 4, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 4. For example, the UE and/or the network node may have exchanged one or more messages of a random access channel (RACH) process.

As shown by reference number 405, the network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit updates to UE AI or ML capabilities. In some aspects, the configuration information may indicated a type of communication that the UE is to use to transmit the updates to the UE AI or ML capabilities. For example, the configuration information may indicate that the UE is to transmit the updates via UAI and/or dynamic UE AI/ML capability signaling.

In some aspects, the configuration information may indicate one or more parameters for transmitting the updates. For example, the configuration information may indicate one or more trigger conditions for transmitting the updates. Additionally, or alternatively, the configuration information may indicate parameters (e.g., a time duration) for a prohibition timer that indicates that the UE is not allowed to transmit an additional update to the capability information until a specified amount of time has passed from transmitting the capability information. For example, the prohibition timer (e.g., an update prohibition timer) may indicate a minimum amount of time between transmitting updates to UE AI or ML capabilities.

The UE may configure itself based at least in part on the configuration information. In some aspects, the UE may be configured to perform one or more operations described herein based at least in part on the configuration information.

As shown by reference number 410, the UE may transmit, and the network node may receive, a capabilities report indicating UE AI and/or ML capabilities. In some aspects, the capabilities report may indicate UE support for transmitting updates to the UE AI or ML capabilities.

In some aspects, the UE AI or ML capabilities indicates parameters such as processing capability, a memory capability, general hardware acceleration capability, supported libraries, supported AI and/or ML model formats, supported AI and/or ML models, a maximum number of concurrent AI and/or ML operations supported, tested model combinations, and/or quantization for the AI and/or ML operations, among other examples.

As shown by reference number 415, the UE and the network node may perform a network connection reconfiguration. For example, the UE or the network node may initiate a process for reestablishing one or more configurations for subsequent communications between the UE and the network node.

As shown by reference number 420, the UE may receive a request for an update to a previously reported set of UE AI or ML capabilities. In some aspects, the UE may receive the request based at least in part on the network connection reconfiguration. In some aspects, the UE may receive the request independently from (e.g., in the absence of) the connection reconfiguration. For example, the connection reconfiguration may be omitted.

As shown by reference number 425, the UE may detect a change in UE AI or ML capabilities. For example, the UE may detect a change in a power level of the UE, additional processes being performed on the UE that consume additional computing and/or memory resources, and/or a change in settings at the UE, among other examples.

In some aspects, the UE may detect the change in UE AI or ML capabilities independently from (e.g., in the absence of) the connection reconfiguration and/or the request for the update described in connection with reference numbers 415 and/or 420. For example, the connection reconfiguration and/or the request for the update may be omitted.

As shown by reference number 430, the UE may identify satisfaction of a trigger condition for transmitting updates to UE AI or ML capabilities. For example, the trigger condition may include detection that the UE is unable to satisfy a timing requirement (e.g., an inference or training deadline, among other example) associated with performing one or more UE AI or ML operations that the UE is configured to perform based at least in part on the previously reported set of UE AI or ML capabilities.

In some aspects, the UE may identify satisfaction of the trigger condition as a trigger for transmitting an update to the previously reported set of UE AI or ML capabilities (e.g., described in connection with reference number 435). In some aspects, the UE may transmit the update based at least in part on the detecting that the change in UE AI or ML capabilities satisfies a threshold amount of change.

The one or more triggering conditions may include processing capability of the UE is reduced to a configured percentage value (e.g., 75%, 50%, or 25%, among other examples), available memory of the UE is reduced to a configured percentage value (e.g., 75%, 50%, or 25%, among other examples), hardware acceleration of the UE is reduced to a configured percentage value, (e.g., 75%, 50%, or 25%, among other examples), a capability of the UE to run a maximum number of concurrent AI or ML operations (e.g., tasks) is reduced by configured threshold (e.g., if UE can run only up to $\{`Y_1`,`Y_2`, . . . , `Y_K`\}$ number of AI/ML models simultaneously), and/or a deadline (e.g., inference/training time requirement) failing to be satisfied for a number (e.g., one or more than one) configured model or a configured number (e.g., one or more than one) model combination for a configured number of operations (e.g., a single iterations with a missed deadline or a number of iterations with missed deadlines), among other examples. In some aspects, the UE may transmit the update based at least in part on satisfaction of a number of triggering conditions (e.g., 1 or multiple) and/or satisfaction of a number of occasions for which the trigger conditions are satisfied (e.g., 1 or multiple occasions to use the UE AI or ML models), among other examples.

As shown by reference number 435, the UE may transmit, and the network node may receive, an update to the previously reported set of UE AI and/or ML capabilities. In some aspects, the UE may transmit the update via UAI and/or via dynamic capability update signaling (e.g., an RRC message). In some aspects, the UE may transmit the update based at least in part on detecting the change in UE AI or ML capabilities (e.g., a threshold amount of change), identifying satisfaction of the trigger condition, and/or the prohibition timer being expired (e.g., the prohibition time not restricting transmission of the update), among other examples.

In some aspects, the dynamic capability update signaling includes RRC signaling, an indication of whether the UE supports one or more UE AI or ML operations, autonomous signaling, and/or trigger-condition-based signaling.

In some aspects, the update may indicate whether the UE supports performance of one or more UE AI or ML operations, the update to the previously reported set of UE AI or ML capabilities (e.g., updated indications of available resources and/or performance parameters for the UE AI or ML operations individually or when used in model combinations, among other examples), one or more UE AI or ML models affected by the update to the previously reported set of UE AI or ML capabilities (e.g., one or more models having degraded performance based at least in part on a change in UE AI or ML capabilities), one or more additional UE AI or ML models that unaffected by the update to the previously reported set of UE AI or ML capabilities (e.g., one or more models that can continue to operate with the change in UE AI or ML capabilities), and/or performance parameter updates for the one or more of the UE AI or ML models, among other examples. In some aspects, the performance parameter updates may support satisfaction of timing requirements (e.g., inference and/or training deadlines) associated with the one or more UE AI or ML models. For example, the performance parameter updates may indicate model quantization levels for the one or more UE AI or ML models, among other examples.

In some aspects, the update may indicate one or more model combinations that the UE supports based at least in part on the update to the previously reported set of UE AI or ML capabilities, performance parameters associated with the one or more model combinations that the UE supports based at least in part on the update to the previously reported set of UE AI or ML capabilities, and/or one or more model combinations that the UE does not support based at least in part on the update to the previously reported set of UE AI or ML capabilities, among other examples. In some aspects, the update may indicate performance parameters associated with the one or more model combinations that the UE does not support based at least in part on the update to the previously reported set of UE AI or ML capabilities.

As shown by reference number 440, the UE may initiate a prohibition timer. The prohibition timer may indicate a minimum amount of time between transmitting updates to UE AI or ML capabilities. In some aspects, the prohibition timer may be configured in a communication protocol and/or via configuration information from the network node or another network node.

As shown by reference number 445, the network node may identify UE AI or ML operations and/or parameters for the UE to use for communications with the network node. In some aspects, the network node may identify, based at least in part on the update to the previously reported set of UE AI and/or ML capabilities, to configure the UE to cease one or more of the UE AI or ML operations (e.g., all of the UE AI or ML operations), to configure updated configurations of the UE AI or ML operations, and/or to configure the UE to use an additional UE AI or ML operation (e.g., a replacement UE AI or ML operation), among other examples.

As shown by reference number 450, the UE may receive, and the network node may transmit, a configuration associated with performance of the UE AI or ML operations. For example, the UE may receive the configuration based at least in part on the update transmitted in connection with reference number 435 and/or the identification of the UE AI or ML capabilities described in connection with reference number 440, among other examples.

As shown by reference number 455, the UE my update UE AI or ML operations based at least in part on the configuration. For example, the UE may cease (e.g., disable) all of the UE AI or ML operations, the UE may cease one or more of the UE AI or ML operations (e.g., UE AI or ML operations indicated as being affected by the change in the UE AI or ML capabilities), and/or the UE may use one or more additional UE AI or ML operations, among other examples. In some aspects, the UE may replace a UE AI or ML model that is affected by the change in UE AI or ML capabilities with an additional UE AI or ML operations or may replace a configuration of the UE AI or ML model that is affected by the change in UE AI or ML capabilities, among other examples. For example, the UE may replace a configured quantization of the UE AI or ML model that is affected by the change in UE AI or ML capabilities such that the UE AI or ML capabilities are configured to allow the UE to satisfy timing requirements of the UE AI or ML model.

As shown by reference number 460, the UE and the network node may communicate based at least in part on the update to the UE AI or ML operations.

Based at least in part on the UE transmitting an update to UE AI or ML capabilities, the network node may update configurations and/or AI or ML models for the UE to use in communication with the network node that is based at least in part on the updated UE AI or ML capabilities. In this way, the UE may avoid a configuration of AI or ML operations that are likely to fail based at least in part on reduced UE AI or ML capabilities. Avoiding a configuration of AI or ML operations that are likely to fail may conserve computing, power, network, and/or communication resources that may have otherwise been consumed based at least in part on lost efficiencies that may have been gained by using the UE AI or ML models (or replacement UE AI or ML models) and/or based at least in part on detecting and/or correcting communication errors caused by the failure, among other examples.

As indicated above, FIG. 4 is provided as an example. Other examples may differ from what is described with respect to FIG. 4.

Figure 5:
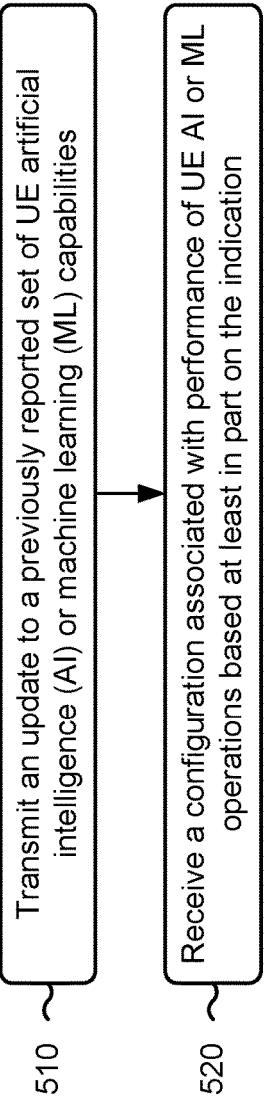
FIGS. 5 and 6 are diagrams illustrating example processes associated with updated artificial intelligence or machine learning capabilities reporting, in accordance with the present disclosure.

FIG. 5 is a diagram illustrating an example process 500 performed, for example, by a UE, in accordance with the present disclosure. Example process 500 is an example where the UE (e.g., UE 120) performs operations associated with updated AI or ML capabilities reporting.

As shown in FIG. 5, in some aspects, process 500 may include transmitting an update to a previously reported set of UE AI or ML capabilities (block 510). For example, the UE (e.g., using communication manager 140 and/or transmission component 704, depicted in FIG. 7) may transmit an update to a previously reported set of UE AI or ML capabilities, as described above.

As further shown in FIG. 5, in some aspects, process 500 may include receiving a configuration associated with performance of UE AI or ML operations based at least in part on the update (block 520). For example, the UE (e.g., using communication manager 140 and/or reception component 702, depicted in FIG. 7) may receive a configuration associated with performance of UE AI or ML operations based at least in part on the update, as described above.

Process 500 may include additional aspects, such as any single aspect or any combination of aspects described below and/or in connection with one or more other processes described elsewhere herein.

In a first aspect, transmitting the update to the previously reported set of UE AI or ML capabilities comprises one or more of transmitting the indication via UAI, or transmitting the update via dynamic capability update signaling.

In a second aspect, alone or in combination with the first aspect, the dynamic capability update signaling comprises one or more of RRC signaling, an indication of whether the UE supports one or more UE AI or ML operations, autonomous signaling, or triggering-condition-based signaling.

In a third aspect, alone or in combination with one or more of the first and second aspects, the update to the previously reported set of UE AI or ML capabilities indicates one or more of whether the UE supports performance of one or more UE AI or ML operations, the update to the previously reported set of UE AI or ML capabilities, one or more UE AI or ML models affected by the update to the previously reported set of UE AI or ML capabilities, one or more additional UE AI or ML models unaffected by the update to the previously reported set of UE AI or ML capabilities, or performance parameter updates for the one or more of the UE AI or ML models, the performance parameter updates supporting satisfaction of timing requirements associated with the one or more UE AI or ML models.

In a fourth aspect, alone or in combination with one or more of the first through third aspects, the update to the previously reported set of UE AI or ML capabilities indicates one or more of one or more model combinations that the UE supports based at least in part on the update to the previously reported set of UE AI or ML capabilities, performance parameters associated with the one or more model combinations that the UE supports based at least in part on the update to the previously reported set of UE AI or ML capabilities, one or more model combinations that the UE does not support based at least in part on the update to the previously reported set of UE AI or ML capabilities, or performance parameters associated with the one or more model combinations that the UE does not support based at least in part on the update to the previously reported set of UE AI or ML capabilities.

In a fifth aspect, alone or in combination with one or more of the first through fourth aspects, transmitting the update to the previously reported set of UE AI or ML capabilities is based at least in part on detection that the UE is unable to satisfy a timing requirement associated with performing one or more UE AI or ML operations that the UE is configured to perform based at least in part on the previously reported set of UE AI or ML capabilities.

In a sixth aspect, alone or in combination with one or more of the first through fifth aspects, process 500 includes receiving an indication of a configuration for transmitting the update to the previously reported set of UE AI or ML capabilities.

In a seventh aspect, alone or in combination with one or more of the first through sixth aspects, the configuration for transmitting the update to the previously reported set of UE AI or ML capabilities indicates one or more of an update prohibition timer that indicates a minimum amount of time between transmitting updates to UE AI or ML capabilities, or one or more trigger conditions for transmitting updates to UE AI or ML capabilities.

In an eighth aspect, alone or in combination with one or more of the first through seventh aspects, process 500 includes detecting a change in UE AI or ML capabilities, wherein transmission of the update to the previously reported set of UE AI or ML capabilities is based at least in part on detecting the change.

In a ninth aspect, alone or in combination with one or more of the first through eighth aspects, transmission of the update to the previously reported set of UE AI or ML capabilities is based at least in part on detecting that the change in UE AI or ML capabilities satisfies a threshold amount of change.

In a tenth aspect, alone or in combination with one or more of the first through ninth aspects, the configuration associated with performance of UE AI or ML operations indicates one or more of ceasing to all of the UE AI or ML operations, ceasing to one or more of the UE AI or ML operations, updating configurations of the UE AI or ML operations, or using to an additional UE AI or ML operation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:

FIG. 6 is a diagram illustrating an example process 600 performed, for example, by a network node, in accordance with the present disclosure. Example process 600 is an example where the network node (e.g., base station 110, a CU, a DU, and/or an RU) performs operations associated with updated AI or ML capabilities reporting.

As shown in FIG. 6, in some aspects, process 600 may include receiving an update to a previously reported set of UE AI or ML capabilities (block 610). For example, the network node (e.g., using communication manager 150 and/or reception component 802, depicted in FIG. 8) may receive an update to a previously reported set of UE AI or ML capabilities, as described above.

As further shown in FIG. 6, in some aspects, process 600 may include transmitting a configuration associated with performance of UE AI or ML operations based at least in part on the update (block 620). For example, the network node (e.g., using communication manager 150 and/or transmission component 804, depicted in FIG. 8) may transmit a configuration associated with performance of UE AI or ML operations based at least in part on the update, as described above.

Process 600 may include additional aspects, such as any single aspect or any combination of aspects described below and/or in connection with one or more other processes described elsewhere herein.

In a first aspect, receiving the update to the previously reported set of UE AI or ML capabilities comprises one or more of receiving the indication via UAI, or receiving the update via dynamic capability update signaling.

In a second aspect, alone or in combination with the first aspect, the dynamic capability update signaling comprises one or more of RRC signaling, an indication of whether the UE supports one or more UE AI or ML operations, autonomous signaling, or triggering-condition-based signaling.

In a third aspect, alone or in combination with one or more of the first and second aspects, the update to the previously reported set of UE AI or ML capabilities indicates one or more of whether the UE supports performance of one or more UE AI or ML operations, the update to the previously reported set of UE AI or ML capabilities, one or more UE AI or ML models affected by the update to the previously reported set of UE AI or ML capabilities, one or more additional UE AI or ML models unaffected by the update to the previously reported set of UE AI or ML capabilities, or performance parameter updates for the one or more of the UE AI or ML models, the performance parameter updates supporting satisfaction of timing requirements associated with the one or more UE AI or ML models.

In a fourth aspect, alone or in combination with one or more of the first through third aspects, the update to the previously reported set of UE AI or ML capabilities indicates one or more of one or more model combinations that the UE supports based at least in part on the update to the previously reported set of UE AI or ML capabilities, performance parameters associated with the one or more model combinations that the UE supports based at least in part on the update to the previously reported set of UE AI or ML capabilities, one or more model combinations that the UE does not support based at least in part on the update to the previously reported set of UE AI or ML capabilities, or performance parameters associated with the one or more model combinations that the UE does not support based at least in part on the update to the previously reported set of UE AI or ML capabilities.

In a fifth aspect, alone or in combination with one or more of the first through fourth aspects, receiving the update to the previously reported set of UE AI or ML capabilities is based at least in part on detection that the UE is unable to satisfy a timing requirement associated with performing one or more UE AI or ML operations that the UE is configured to perform based at least in part on the previously reported set of UE AI or ML capabilities.

In a sixth aspect, alone or in combination with one or more of the first through fifth aspects, process 600 includes transmitting an indication of a configuration for transmitting the update to the previously reported set of UE AI or ML capabilities.

In a seventh aspect, alone or in combination with one or more of the first through sixth aspects, the configuration for transmitting the update to the previously reported set of UE AI or ML capabilities indicates one or more of an update prohibition timer that indicates a minimum amount of time between transmitting updates to UE AI or ML capabilities, or one or more trigger conditions for transmitting updates to UE AI or ML capabilities.

In an eighth aspect, alone or in combination with one or more of the first through seventh aspects, the configuration associated with performance of UE AI or ML operations indicates one or more of ceasing to all of the UE AI or ML operations, ceasing to one or more of the UE AI or ML operations, updating configurations of the UE AI or ML operations, or using to an additional UE AI or ML operation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
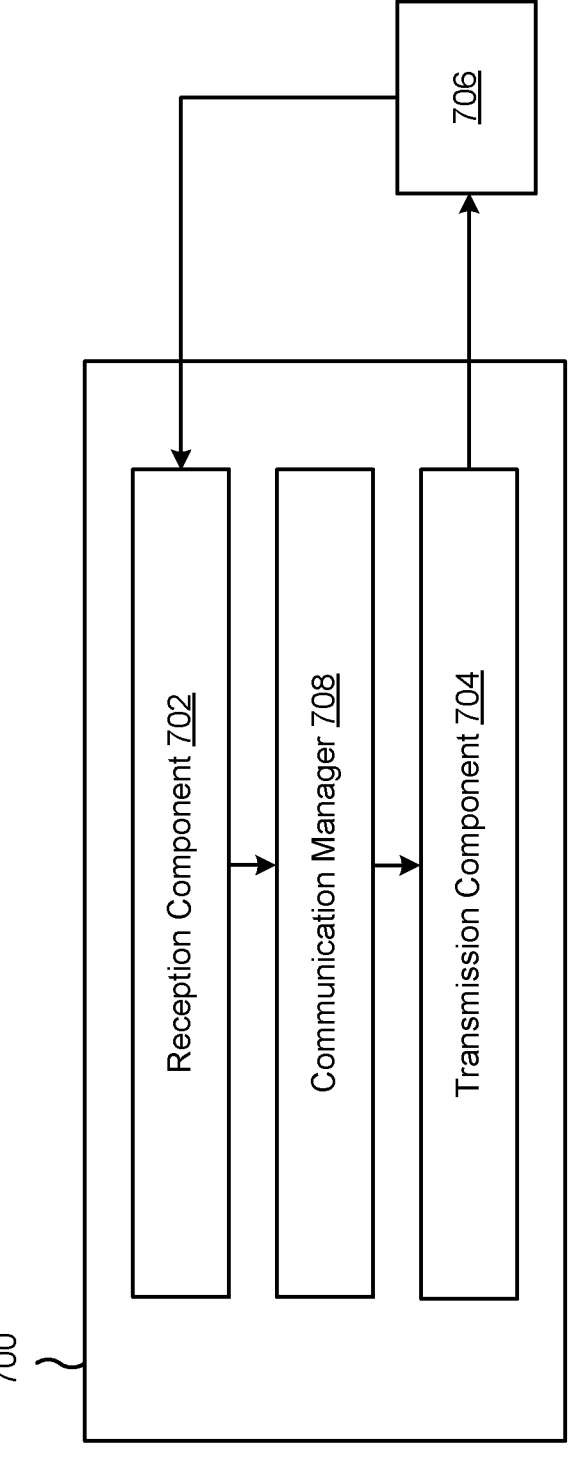
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a network node, or another wireless communication device) using the reception component 702 and the transmission component 704. As further shown, the apparatus 700 may include a communication manager 708 (e.g., the communication manager 140).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit an update to a previously reported set of UE AI or ML capabilities. The reception component 702 may receive a configuration associated with performance of UE AI or ML operations based at least in part on the update.

The reception component 702 may receive an indication of a configuration for transmitting the update to the previously reported set of UE AI or ML capabilities.

The communication manager 708 may detect a change in UE AI or ML capabilities wherein transmission of the update to the previously reported set of UE AI or ML capabilities is based at least in part on detecting the change.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
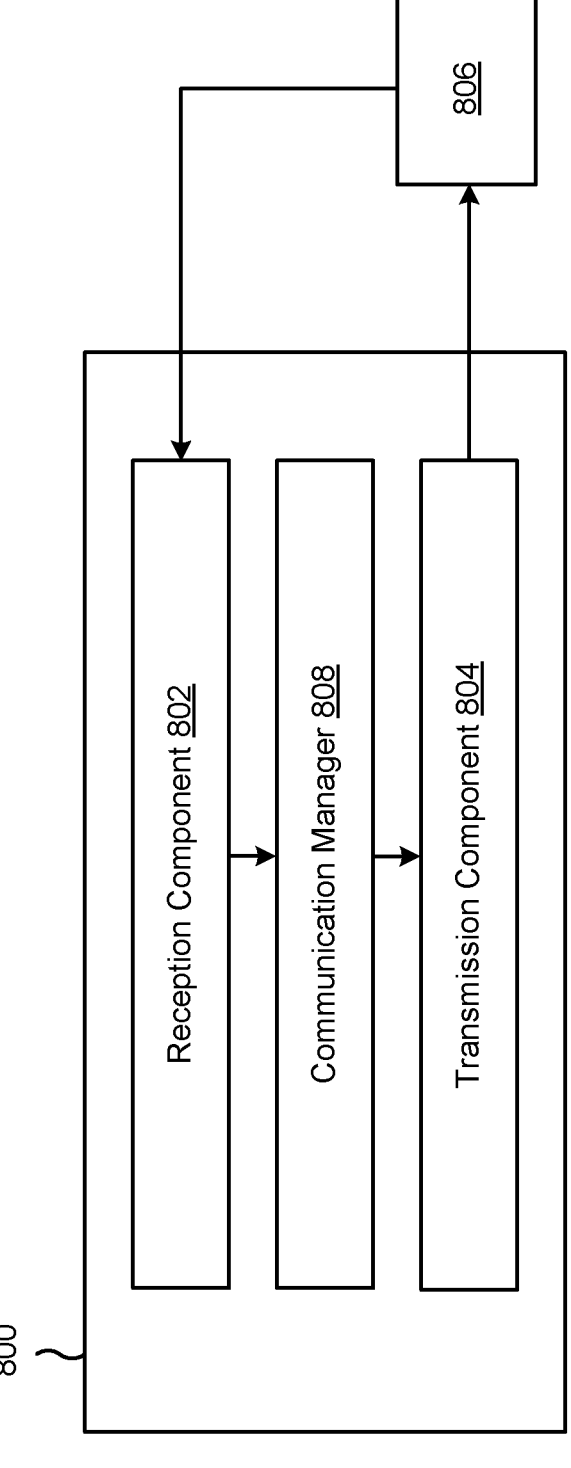

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include a communication manager 808 (e.g., the communication manager 150).

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The reception component 802 may receive an update to a previously reported set of UE AI or ML capabilities. The transmission component 804 may transmit a configuration associated with performance of UE AI or ML operations based at least in part on the update.

The transmission component 804 may transmit an indication of a configuration for transmitting the update to the previously reported set of UE AI or ML capabilities.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting an update to a previously reported set of UE artificial intelligence (AI) or machine learning (ML) capabilities; and receiving a configuration associated with performance of UE AI or ML operations based at least in part on the update.

Aspect 2: The method of Aspect 1, wherein transmitting the update to the previously reported set of UE AI or ML capabilities comprises one or more of: transmitting the update via UE assistance information (UAI), or transmitting the update via dynamic capability update signaling.

Aspect 3: The method of Aspect 2, wherein the dynamic capability update signaling comprises one or more of: radio resource control (RRC) signaling, an indication of whether the UE supports one or more UE AI or ML operations, autonomous signaling, or trigger-condition-based signaling.

Aspect 4: The method of any of Aspects 1-3, wherein the update to the previously reported set of UE AI or ML capabilities indicates one or more of: whether the UE supports performance of one or more UE AI or ML operations, the update to the previously reported set of UE AI or ML capabilities, one or more UE AI or ML models affected by the update to the previously reported set of UE AI or ML capabilities, one or more additional UE AI or ML models unaffected by the update to the previously reported set of UE AI or ML capabilities, or performance parameter updates for the one or more of the UE AI or ML models, the performance parameter updates supporting satisfaction of timing requirements associated with the one or more UE AI or ML models.

Aspect 5: The method of any of Aspects 1-4, wherein the update to the previously reported set of UE AI or ML capabilities indicates one or more of: one or more model combinations that the UE supports based at least in part on the update to the previously reported set of UE AI or ML capabilities, performance parameters associated with the one or more model combinations that the UE supports based at least in part on the update to the previously reported set of UE AI or ML capabilities, one or more model combinations that the UE does not support based at least in part on the update to the previously reported set of UE AI or ML capabilities, or performance parameters associated with the one or more model combinations that the UE does not support based at least in part on the update to the previously reported set of UE AI or ML capabilities.

Aspect 6: The method of any of Aspects 1-5, wherein transmitting the update to the previously reported set of UE AI or ML capabilities is based at least in part on detection that the UE is unable to satisfy a timing requirement associated with performing one or more UE AI or ML operations that the UE is configured to perform based at least in part on the previously reported set of UE AI or ML capabilities.

Aspect 7: The method of any of Aspects 1-6, further comprising: receiving an indication of a configuration for transmitting the update to the previously reported set of UE AI or ML capabilities.

Aspect 8: The method of Aspect 7, wherein the configuration for transmitting the update to the previously reported set of UE AI or ML capabilities indicates one or more of: an update prohibition timer that indicates a minimum amount of time between transmitting updates to UE AI or ML capabilities, or one or more trigger conditions for transmitting updates to UE AI or ML capabilities.

Aspect 9: The method of any of Aspects 1-8, further comprising: detecting a change in UE AI or ML capabilities, wherein transmission of the update to the previously reported set of UE AI or ML capabilities is based at least in part on detecting the change.

Aspect 10: The method of Aspect 9, wherein transmission of the update to the previously reported set of UE AI or ML capabilities is based at least in part on detecting that the change in UE AI or ML capabilities satisfies a threshold amount of change.

Aspect 11: The method of any of Aspects 1-10, wherein the configuration associated with performance of UE AI or ML operations indicates one or more of: to cease all of the UE AI or ML operations, to cease one or more of the UE AI or ML operations, updated configurations of the UE AI or ML operations, or to use an additional UE AI or ML operation.

Aspect 12: A method of wireless communication performed by a network node, comprising: receiving an update to a previously reported set of user equipment (UE) artificial intelligence (AI) or machine learning (ML) capabilities; and transmitting a configuration associated with performance of UE AI or ML operations based at least in part on the update.

Aspect 13: The method of Aspect 12, wherein receiving the update to the previously reported set of UE AI or ML capabilities comprises one or more of: receiving the update via UE assistance information (UAI), or receiving the update via dynamic capability update signaling.

Aspect 14: The method of Aspect 13, wherein the dynamic capability update signaling comprises one or more of: radio resource control (RRC) signaling, an indication of whether the UE supports one or more UE AI or ML operations, autonomous signaling, or trigger-condition-based signaling.

Aspect 15: The method of any of Aspects 12-14, wherein the update to the previously reported set of UE AI or ML capabilities indicates one or more of: whether the UE supports performance of one or more UE AI or ML operations, the update to the previously reported set of UE AI or ML capabilities, one or more UE AI or ML models affected by the update to the previously reported set of UE AI or ML capabilities, one or more additional UE AI or ML models unaffected by the update to the previously reported set of UE AI or ML capabilities, or performance parameter updates for the one or more of the UE AI or ML models, the performance parameter updates supporting satisfaction of timing requirements associated with the one or more UE AI or ML models.

Aspect 16: The method of any of Aspects 12-15, wherein the update to the previously reported set of UE AI or ML capabilities indicates one or more of: one or more model combinations that the UE supports based at least in part on the update to the previously reported set of UE AI or ML capabilities, performance parameters associated with the one or more model combinations that the UE supports based at least in part on the update to the previously reported set of UE AI or ML capabilities, one or more model combinations that the UE does not support based at least in part on the update to the previously reported set of UE AI or ML capabilities, or performance parameters associated with the one or more model combinations that the UE does not support based at least in part on the update to the previously reported set of UE AI or ML capabilities.

Aspect 17: The method of any of Aspects 12-16, wherein receiving the update to the previously reported set of UE AI or ML capabilities is based at least in part on detection that the UE is unable to satisfy a timing requirement associated with performing one or more UE AI or ML operations that the UE is configured to perform based at least in part on the previously reported set of UE AI or ML capabilities.

Aspect 18: The method of any of Aspects 12-17, further comprising: transmitting an indication of a configuration for transmitting the update to the previously reported set of UE AI or ML capabilities.

Aspect 19: The method of Aspect 18, wherein the configuration for transmitting the update to the previously reported set of UE AI or ML capabilities indicates one or more of: an update prohibition timer that indicates a minimum amount of time between transmitting updates to UE AI or ML capabilities, or one or more trigger conditions for transmitting updates to UE AI or ML capabilities.

Aspect 20: The method of any of Aspects 12-19, wherein the configuration associated with performance of UE AI or ML operations indicates one or more of: to cease all of the UE AI or ML operations, to cease one or more of the UE AI or ML operations, updated configurations of the UE AI or ML operations, or to use an additional UE AI or ML operation.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to:
      receive radio resource control (RRC) signaling indicating that the UE is to transmit updates to UE artificial intelligence (AI) or machine learning (ML) capabilities via UE assistance information (UAI);
      transmit, via the UAI and based at least in part on the RRC signaling, an update to a previously reported set of the UE AI or ML capabilities,
         wherein the update indicates one or more UE AI or ML models affected by the update; and
      receive a configuration associated with performance of UE AI or ML operations based at least in part on the update,
         wherein the configuration indicates to cease one or more of the UE AI or ML operations indicated as being affected by the update.

2. The UE of claim 1, wherein the one or more processors, to transmit the update, are configured to:
   transmit the update via dynamic capability update signaling.

3. The UE of claim 2, wherein the dynamic capability update signaling comprises one or more of:
   RRC signaling,
   an indication of whether the UE supports one or more UE AI or ML operations,
   autonomous signaling, or
   trigger-condition-based signaling.

4. The UE of claim 1, wherein the update further indicates one or more of:
   whether the UE supports performance of one or more UE AI or ML operations,
   one or more additional UE AI or ML models unaffected by the update, or
   performance parameter updates for the one or more UE AI or ML models, the performance parameter updates supporting satisfaction of timing requirements associated with the one or more UE AI or ML models.

5. The UE of claim 1, wherein the update further indicates one or more of:
   one or more model combinations that the UE supports based at least in part on the update, performance parameters associated with the one or more
model combinations that the UE supports based at least
in part on the update,
one or more model combinations that the UE does not
support based at least in part on the update, or
performance parameters associated with the one or more
model combinations that the UE does not support based
at least in part on the update.

6. The UE of claim 1, wherein the one or more processors,
to transmit the update, are configured to transmit the update
based at least in part on detection that the UE is unable to
satisfy a timing requirement associated with one or more UE
AI or ML operations that the UE is configured to perform
based at least in part on the previously reported set of UE AI
or ML capabilities.

7. The UE of claim 1, wherein the one or more processors
are further configured to:
receive a request for transmitting the update.

8. The UE of claim 1, wherein the RRC signaling further
indicates one or more of:
an update prohibition timer that indicates a minimum
amount of time between transmissions of updates to the
UE AI or ML capabilities, or
one or more trigger conditions for the transmissions of
updates to the UE AI or ML capabilities.

9. The UE of claim 1, wherein the one or more processors
are further configured to:
detect a change in the UE AI or ML capabilities,
wherein transmission of the update is based at least in
part on the change in the UE AI or ML capabilities.

10. The UE of claim 9, wherein the transmission of the
update is based at least in part on the change in the UE AI
or ML capabilities satisfying a threshold amount of change.

11. The UE of claim 1, wherein the configuration further
indicates updated configurations of the UE AI or ML opera-
tions.

12. A network node for wireless communication, com-
prising:
one or more memories; and
one or more processors, coupled to the one or more
memories, individually or collectively configured to:
transmit radio resource control (RRC) signaling indi-
cating that a user equipment (UE) is to transmit
updates to UE artificial intelligence (AI) or machine
learning (ML) capabilities via UE assistance infor-
mation (UAI);
receive, via the UAI and based at least in part on the
RRC signaling, an update to a previously reported
set of the UE AI or ML capabilities,
wherein the update indicates one or more UE AI or
ML models affected by the update; and
transmit a configuration associated with performance
of UE AI or ML operations based at least in part on
the update,
wherein the configuration indicates to cease one or
more of the UE AI or ML operations indicated as
being affected by the update.

13. The network node of claim 12, wherein the one or
more processors, to receive the update, are configured to:
receive the update via dynamic capability update signal-
ing.

14. The network node of claim 13, wherein the dynamic
capability update signaling comprises one or more of:
RRC signaling,
an indication of whether the UE supports one or more UE
AI or ML operations,
autonomous signaling, or
trigger-condition-based signaling.

15. The network node of claim 12, wherein the update
further indicates one or more of:
whether the UE supports performance of one or more UE
AI or ML operations,
one or more additional UE AI or ML models unaffected by
the update, or
performance parameter updates for the one or more UE AI
or ML models, the performance parameter updates
supporting satisfaction of timing requirements associ-
ated with the one or more UE AI or ML models.

16. The network node of claim 12, wherein the update
further indicates one or more of:
one or more model combinations that the UE supports
based at least in part on the update,
performance parameters associated with the one or more
model combinations that the UE supports based at least
in part on the update,
one or more model combinations that the UE does not
support based at least in part on the update, or
performance parameters associated with the one or more
model combinations that the UE does not support based
at least in part on the update.

17. The network node of claim 12, wherein the one or
more processors, to receive the update, are configured to
receive the update based at least in part on detection that the
UE is unable to satisfy a timing requirement associated with
one or more UE AI or ML operations that the UE is
configured to perform based at least in part on the previously
reported set of UE AI or ML capabilities.

18. The network node of claim 12, wherein the one or
more processors are further configured to:
transmit a request for transmitting the update.

19. The network node of claim 12, wherein the RRC
signaling further indicates one or more of:
an update prohibition timer that indicates a minimum
amount of time between transmissions of updates to the
UE AI or ML capabilities, or
one or more trigger conditions for the transmissions of
updates to the UE AI or ML capabilities.

20. The network node of claim 12, wherein the configu-
ration further indicates updated configurations of the UE AI
or ML operations.

21. A method of wireless communication performed by a
user equipment (UE), comprising:
receiving radio resource control (RRC) signaling indicat-
ing that the UE is to transmit updates to UE artificial
intelligence (AI) or machine learning (ML) capabilities
via UE assistance information (UAI);
transmitting, via the UAI and based at least in part on
receiving the RRC signaling, an update to a previously
reported set of the UE AI or ML capabilities,
wherein the update indicates one or more UE AI or ML
models affected by the update; and
receiving a configuration associated with performance of
UE AI or ML operations based at least in part on the
update,
wherein the configuration indicates to cease one or
more of the UE AI or ML operations indicated as
being affected by the update.

22. The method of claim 21, wherein transmitting the
update comprises:
transmitting the update via dynamic capability update
signaling.

23. The method of claim 22, wherein the dynamic capability update signaling comprises one or more of:

RRC signaling, an indication of whether the UE supports one or more UE AI or ML operations, autonomous signaling, or trigger-condition-based signaling.

24. The method of claim 21, wherein the update indicates one or more of:

whether the UE supports performance of one or more UE AI or ML operations, one or more additional UE AI or ML models unaffected by the update, or performance parameter updates for the one or more UE AI or ML models, the performance parameter updates supporting satisfaction of timing requirements associated with the one or more UE AI or ML models.

25. The method of claim 21, wherein the update further indicates one or more of:

one or more model combinations that the UE supports based at least in part on the update, performance parameters associated with the one or more model combinations that the UE supports based at least in part on the update, one or more model combinations that the UE does not support based at least in part on the update, or performance parameters associated with the one or more model combinations that the UE does not support based at least in part on the update.

26. A method of wireless communication performed by a network node, comprising:

transmitting radio resource control (RRC) signaling indicating that a user equipment (UE) is to transmit updates to UE artificial intelligence (AI) or machine learning (ML) capabilities via UE assistance information (UAI);

receiving, via the UAI and based at least in part on transmitting the RRC signaling, an update to a previously reported set of the UE AI or ML capabilities, wherein the update indicates one or more UE AI or ML models affected by the update; and transmitting a configuration associated with performance of UE AI or ML operations based at least in part on the update, wherein the configuration indicates to cease one or more of the UE AI or ML operations indicated as being affected by the update.

27. The method of claim 26, wherein receiving the update comprises:

receiving the update via dynamic capability update signaling.

28. The method of claim 27, wherein the dynamic capability update signaling comprises one or more of:

RRC signaling, an indication of whether the UE supports one or more UE AI or ML operations, autonomous signaling, or trigger-condition-based signaling.

29. The method of claim 26, wherein the update further indicates one or more of:

whether the UE supports performance of one or more UE AI or ML operations, one or more additional UE AI or ML models unaffected by the update, or performance parameter updates for the one or more UE AI or ML models, the performance parameter updates supporting satisfaction of timing requirements associated with the one or more UE AI or ML models.

30. The method of claim 26, wherein the update further indicates one or more of:

one or more model combinations that the UE supports based at least in part on the update, performance parameters associated with the one or more model combinations that the UE supports based at least in part on the update, one or more model combinations that the UE does not support based at least in part on the update, or performance parameters associated with the one or more model combinations that the UE does not support based at least in part on the update.

\* \* \* \* \*